United States Patent
Fenton

(10) Patent No.: US 9,164,176 B2
(45) Date of Patent: Oct. 20, 2015

(54) GNSS RECEIVER AND ANTENNA SYSTEM INCLUDING A DIGITAL COMMUNICATION SUBSYSTEM

(75) Inventor: Patrick C. Fenton, Calgary (CA)

(73) Assignee: NovAtel, Inc., Calgary, CA (US)

( * ) Notice: Subject to any disclaimer, the term of this patent is extended or adjusted under 35 U.S.C. 154(b) by 576 days.

(21) Appl. No.: 12/126,021

(22) Filed: May 23, 2008

(65) Prior Publication Data

US 2008/0297407 A1 Dec. 4, 2008

Related U.S. Application Data

(60) Provisional application No. 60/941,437, filed on Jun. 1, 2007.

(51) Int. Cl.
*G01S 19/35* (2010.01)
*G01S 19/03* (2010.01)
(Continued)

(52) U.S. Cl.
CPC ............... *G01S 19/35* (2013.01); *G01S 5/0009* (2013.01); *G01S 5/0036* (2013.01); *G01S 19/03* (2013.01); *G01S 19/33* (2013.01); *G01S 19/07* (2013.01)

(58) Field of Classification Search
CPC ................... G01S 19/45–19/47; G01S 19/03; G01S 19/37; G01S 5/0036
USPC .............................. 342/357.07, 357.09, 357.1
See application file for complete search history.

(56) References Cited

U.S. PATENT DOCUMENTS 5,379,224 A * 1/1995 Brown et al. .................. 701/215
5,420,592 A * 5/1995 Johnson .................... 342/357.12

(Continued)

FOREIGN PATENT DOCUMENTS

WO    WO 03081810 A1 * 10/2003 ............... H04B 7/26
WO    WO 2005045458 A1 * 5/2005 ................ G01S 1/00

(Continued)

OTHER PUBLICATIONS

"1394 Serial Bus Interface: Convergence Bus Promises to Unite PC and Digital Consumer Equipment," http://www.wdc.com/wdproducts/library/other/2579-001014.pdf. Mar. 2000, Western Digital.*

(Continued)

*Primary Examiner* — Gregory C Issing
(74) *Attorney, Agent, or Firm* — Cesari and McKenna, LLP

(57) ABSTRACT

A GNSS receiver and antenna system transmits signals from an antenna structure to a remote GNSS receiver and includes a digital communications subsystem that utilizes a high speed digital communications conductor. The transmissions are digital signals that preserve GNSS satellite signal frequency and/or carrier and code phase information. The system may transmit digital signals corresponding to GNSS signals such as GPS, GLONAS, Galileo and Compass satellite signals. In addition, the system may transmit, over the same digital communications conductor in appropriately formatted digital signals, ranging signals from ground-based transmitters or other satellites, differential GNSS correction signals from beacons or base GPS receivers, and/or signals from transmitting or co-located sensors, such as inertial sensors, temperature sensors and so forth. The digital signals include in headers or payload relative timing and carrier and code phase information and, as appropriate, information that identifies the signals by source or type, such as information that identifies the frequencies or the antennas or antenna elements providing the respective signals.

23 Claims, 9 Drawing Sheets

(51) Int. Cl.
  *G01S 5/02* (2010.01)
  *G01S 5/00* (2006.01)
  *G01S 19/33* (2010.01)
  *G01S 19/07* (2010.01)

(56) References Cited

U.S. PATENT DOCUMENTS

| | | | | |
|---|---|---|---|---|
| 5,434,787 | A | * | 7/1995 | Okamoto et al. ............. 701/214 |
| 5,646,857 | A | * | 7/1997 | McBurney et al. ............ 701/475 |
| 5,812,086 | A | * | 9/1998 | Bertiger et al. .......... 342/357.06 |
| 6,018,784 | A | * | 1/2000 | Gildea et al. ................. 710/311 |
| 6,078,290 | A | | 6/2000 | McBurney et al. |
| 6,560,535 | B2 | | 5/2003 | Levy et al. |
| 6,618,004 | B2 | | 9/2003 | Fenton et al. |
| 7,039,399 | B2 | * | 5/2006 | Fischer ...................... 455/422.1 |
| 2002/0030625 | A1 | * | 3/2002 | Cavallaro et al. ........ 342/357.06 |
| 2008/0068262 | A1 | * | 3/2008 | Loomis .................... 342/357.09 |

FOREIGN PATENT DOCUMENTS

| | | | |
|---|---|---|---|
| WO | WO 2005/086460 | 9/2005 | |
| WO | WO 2006095368 A1 * | 9/2006 | ................ G01S 5/14 |

OTHER PUBLICATIONS

Print out of NordNav R-30 Package brochure from web page www.navtechgps.com/pdf/r30.pdf.

* cited by examiner

GNSS RECEIVER AND ANTENNA SYSTEM INCLUDING A DIGITAL COMMUNICATION SUBSYSTEM

CROSS-REFERENCE TO RELATED APPLICATIONS

The present application claims the benefit of U.S. Provisional Patent Application Ser. No. 60/941,437, which was filed on Jun. 1, 2007, by Patrick C. Fenton for a GNSS RECEIVER AND ANTENNA SYSTEM USING A DIGITAL COMMUNICATIONS CONDUCTOR and is hereby incorporated by reference.

BACKGROUND OF THE INVENTION

In certain environments antennas are placed remotely with respect to GNSS receivers. The antennas may, for example, be placed in areas that have clear views of the sky or areas that are relatively free of sources of multipath. To ensure proper performance of the receiver, the satellite signals received by the antennas are communicated to the GNSS receiver over long runs of relatively expensive Radio Frequency (RF) cable, which has known transmission delays for the frequencies of interest. The receiver then utilizes the signals, to determine position based on the phases of one or more carriers and/or codes in the received satellite signals.

SUMMARY OF THE INVENTION

A GNSS receiver and antenna system that transmits signals from an antenna structure to a remote GNSS receiver includes a digital communications subsystem that utilizes a high-speed digital communications conductor, such as a high speed digital serial link cable, and at the antenna end appropriate connectors and an RF to digital signal converter that produces digital signals that preserve frequency and carrier and code phase information contained in GNSS satellite signals. At the receiver end, the system includes appropriate connectors and, as necessary, a digital to RF signal converter. The long run between the antenna structure and the remote GNSS receiver can thus be made with a relatively low cost digital communication conductor that operates at a sufficiently high speed. Further, signals from other devices, such as, for example, inertial sensors, other satellite or ground-based ranging devices, sensors, and/or differential GNSS correction signals, and so forth, can be similarly converted to digital signals by the system and transmitted to the GNSS receiver over the same high speed digital communications conductor, without loss of necessary relative timing information or other signal information.

The digital communications subsystem formats the digital communications in accordance with an appropriate communication protocol, such as, Ethernet, adding headers and so forth that; as necessary, identify the sources of information and or types of information contained in the signals. The system may further include mechanisms to synchronize the frequencies of local oscillators at the respective converters, such that any frequency shifts are essentially eliminated or known, and can thus be compensated for, or offset, in tracking software in the GNSS receiver. Alternatively, the local oscillators in the converters may operate in accordance with an oscillator that is under the control of the GNSS receiver.

The converter at the antenna end or the antenna structure may produce an intermediate frequency signal, which is sent over the digital communications conductor as an appropriately formatted digital signal. The GNSS receiver may then use the intermediate frequency signal directly, that is, without further conversion, in its acquisition and tracking operations.

BRIEF DESCRIPTION OF THE DRAWINGS

The invention description below refers to the accompanying drawings, of which.

DETAILED DESCRIPTION OF AN ILLUSTRATIVE EMBODIMENT

The system will be described below in accordance with use of the Ethernet transmission protocol, and associated connectors and communication conductors. The system does not require use of the Ethernet protocol and may instead be constructed using other digital communication mechanisms and using other high speed digital communication conductors, such as a high speed digital serial link cable. Further, as discussed herein, the signals are formatted to include, in signal headers and/or as part of the signal payload, information that identifies the signals by frequency and/or as coming from particular sources, such as, particular antennas, various transmitters, such as, beacons, sensors, ground-base ranging devices, other satellites, and so forth. Alternatively, or in addition, signals may be formatted to provide information relating to the type of signal, such as, a temperature reading, and so forth.

Figure 1:
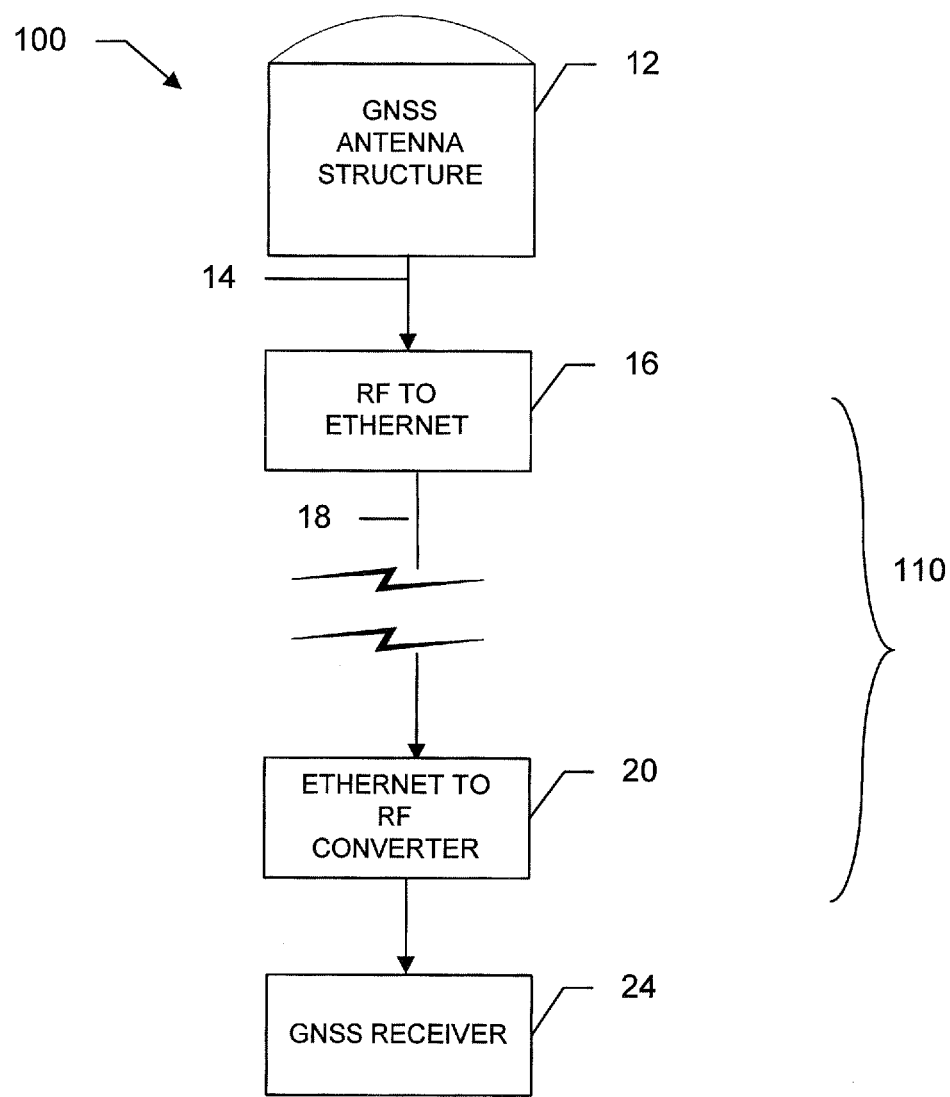
FIG. 1 is a functional block diagram of a system constructed in accordance with the invention.

FIG. 1 depicts a GNSS receiver and antenna system 100 that includes a digital communications subsystem 110 which utilizes a high speed digital communications conductor 18 to transmit received GNSS satellite signals between a GNSS antenna structure 12 and a GNSS receiver 24. The signals are transmitted in the form of digital transmission signals that preserve frequency, and carrier and code phase information.

The antenna structure 12 receives the satellite signals and provides the signals over a short run of conventional RF cable 14 to an RF to Ethernet converter 16. The converter converts the RF signals to digital signals and formats them for transmission over the high speed digital communications conductor. The digital communications conductor may be a Cat5 twisted copper conductor, a fiber optic conductor, a high-speed serial link cable, and so forth.

The antenna structure 12 may include multiple antennas or antenna elements for receiving, for example, GPS, GLONAS, Galileo, Compass and other ranging signals. Alternatively, the antenna structure may be configured for particular GNSS satellite signals, such as L1 and L2 GPS signals. The RF to Ethernet converter 16 converts the respective satellite signals to digital signals that preserve the frequency and phase information that is utilized in global position calculations. The converter adds headers and other information such that the receiver end of the subsystem 110 can recover the respective GNSS signals and provide them to the appropriate GNSS receivers 24.

In the system of FIG. 1, an Ethernet to RF converter 20 recovers the respective GNSS satellite signals from the transmitted signals and provides the recovered signals over a short run of conventional RF cable 22 to the GNSS receiver 24. The GNSS receiver 24 then operates in a known manner to determine position information, such as, pseudoranges and/or global position, based on the phases of codes and/or carriers of the GNSS satellite signals and the locations of the receiver relative to the antenna structure 12. As discussed below with reference to FIG. 7, local oscillators in the converters 16 and may be synchronized, to avoid the adverse effects that frequency shifts due to the conversions from RF to digital and digital to RF can have on carrier and code phases.

Figure 2:
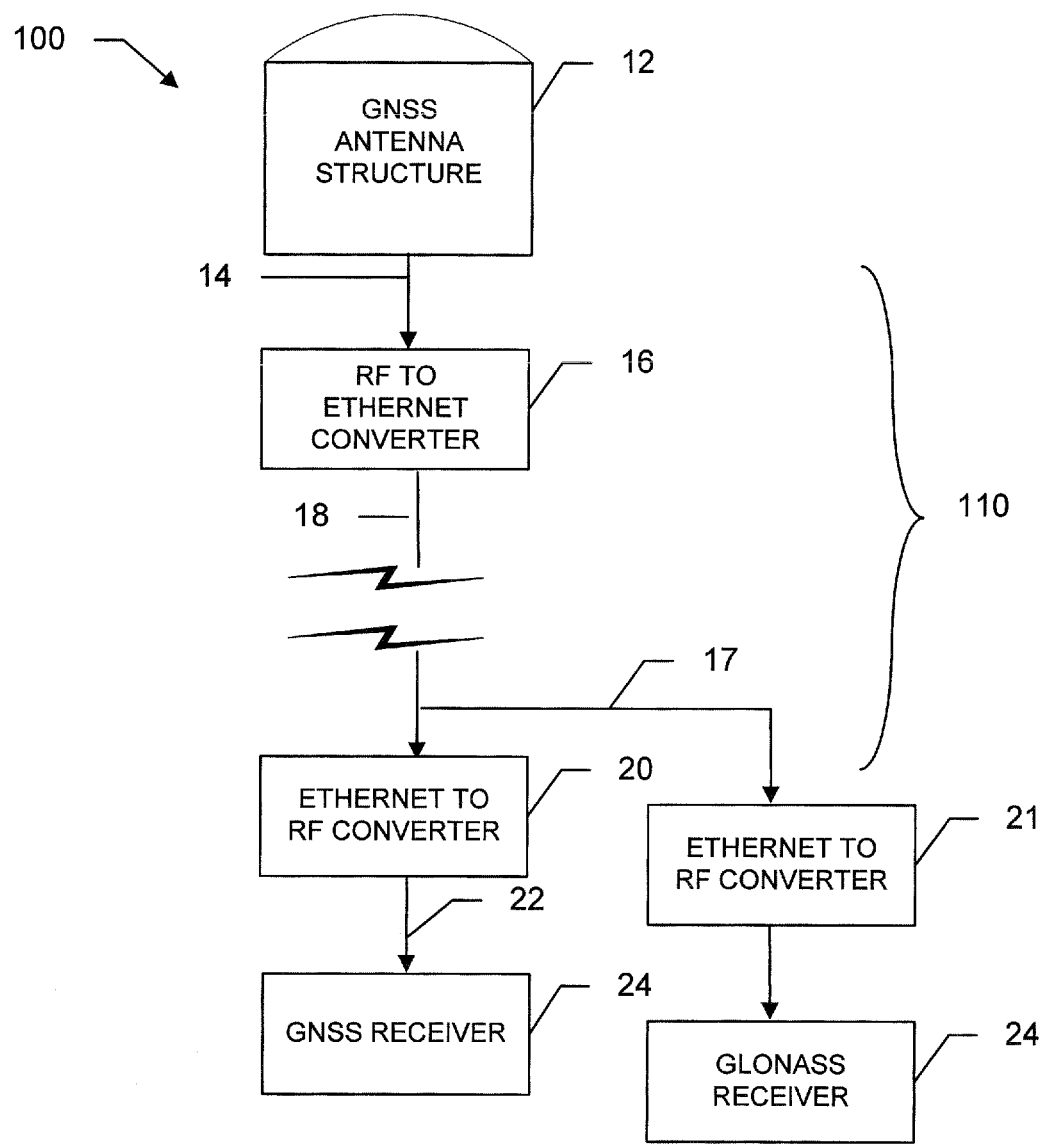
FIG. 2 is a functional block diagram of an alternative system constructed in accordance with the invention.

Referring now to FIG. 2, multiple GNSS receivers 24 may be connected to the digital communications conductor 18, and thus, receive signals transmitted by the digital communication subsystem 110. In the drawing, two GNSS receivers, one depicted as a GPS receiver and one depicted as a GLONAS receiver, are connected through corresponding converters 20 and 21 to receive GNSS signals provided by the GNSS antenna structure 12. The respective converters thus recover the GPS and GLONAS satellite signals, and provide the signals to the receivers. The receivers operate in a conventional manner to determine position information, such as pseudoranges and/or global position from the recovered satellite signals.

Figure 3:
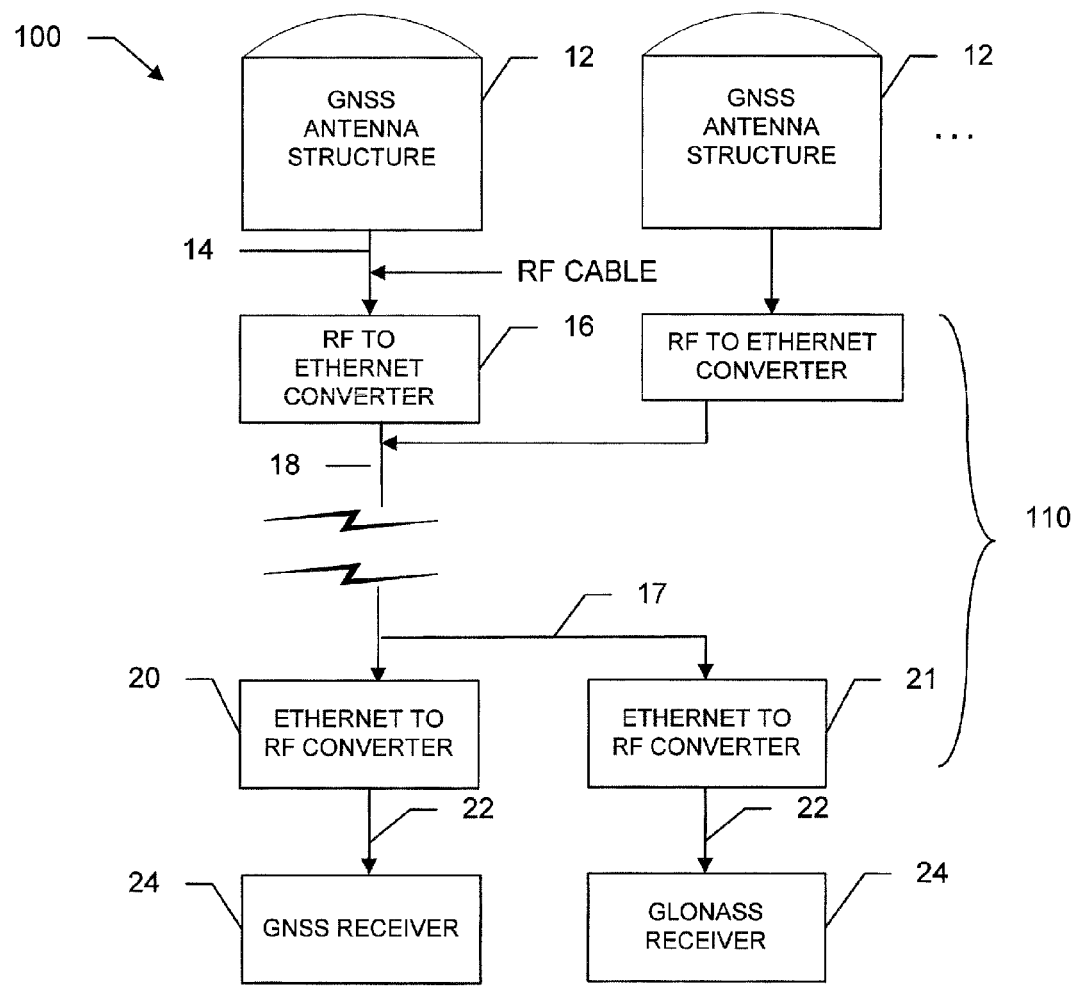
FIG. 3 is a functional block diagram of an alternative system constructed in accordance with the invention.

Referring now to FIG. 3, signals from multiple antenna structures 12 may be transmitted by the digital communications subsystem 110 over the digital communications conductor 18. The respective RF to Ethernet converters 16 convert the RF signals that are provided by the antenna structures to digital signals that are formatted for transmission. The converters thus add appropriate information, such as, for example, headers that identify the signals coming from the respective antenna structures and/or include in the payload information that identifies respective frequencies, and so forth. The converted and formatted signals from the GNSS2 antenna are transmitted over a short run of the digital communications conductor, and these signals are then included in the communications over the long distance run of the digital communications conductor 18 to the GNSS receivers 24. Alternatively, if the two antenna structures are sufficiently close together, they may utilize the same converter. Thus, the system 100 may include one antenna structure that is optimized for GPS signals and a second structure optimized for Galileo signals, and so forth.

As the receiver end of the digital communications subsystem 10, the digital transmission signals are provided to multiple Ethernet to RF converters 20. The converters 20 recover the signals received by the respective antenna structures 12 and provide the recovered signals to the GNSS receivers 24. The GNSS receivers operate in a known manner to produce position information based on the recovered GNSS satellite signals and the locations of the receivers relative to the respective antenna structures.

Figure 4:
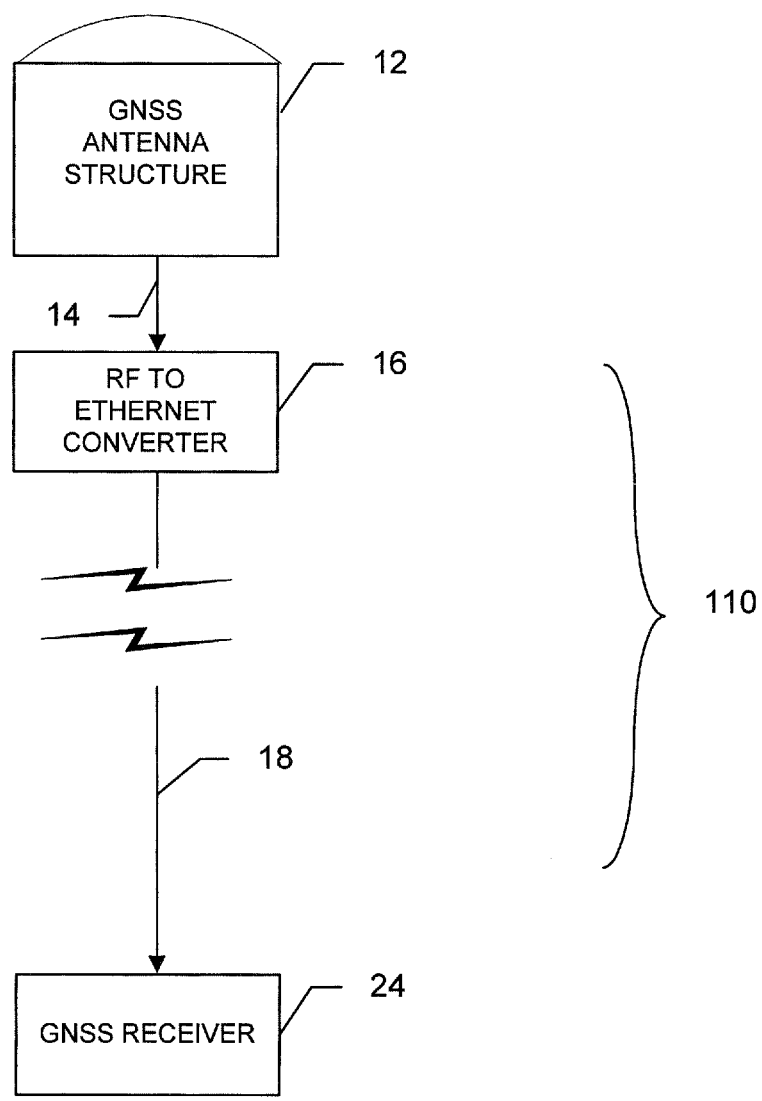
FIG. 4 is a functional block diagram of an alternative system constructed in accordance with the invention.

As depicted in FIG. 4, the GNSS receiver 24 may be configured to process the digital signals directly, without requiring conversion back to RF signals. Accordingly, the RF to Ethernet converter 16 converts the received satellite signals to digital signals and formats the signals for communication over the digital communications conductor 18. The GNSS receiver connected to the digital communications conductor 18 through appropriate connectors (not shown) then utilizes the digital signals directly to recover, acquire and track the carriers and codes and determine position information. Additional antenna structures and receivers (not shown) may similarly communicate over the digital communications conductor 18.

The converter 16 may include a low noise amplifier, filter and downconverter that manipulate the received GNSS satellite signals and produce one or more intermediate frequency (IF) signals. The converter then samples the IF signal, or as appropriate, multiple IF signals, and converts the samples to digital signals for transmission over the high speed digital communications conductor 18. The GNSS receiver 24 recovers the carrier and code phase information from the signals and performs acquisition and tracking operations in software and/or firmware. The GNSS receiver may thus be configured as a digital signal processor operable in, for example, a general purpose computer.

Figure 5:
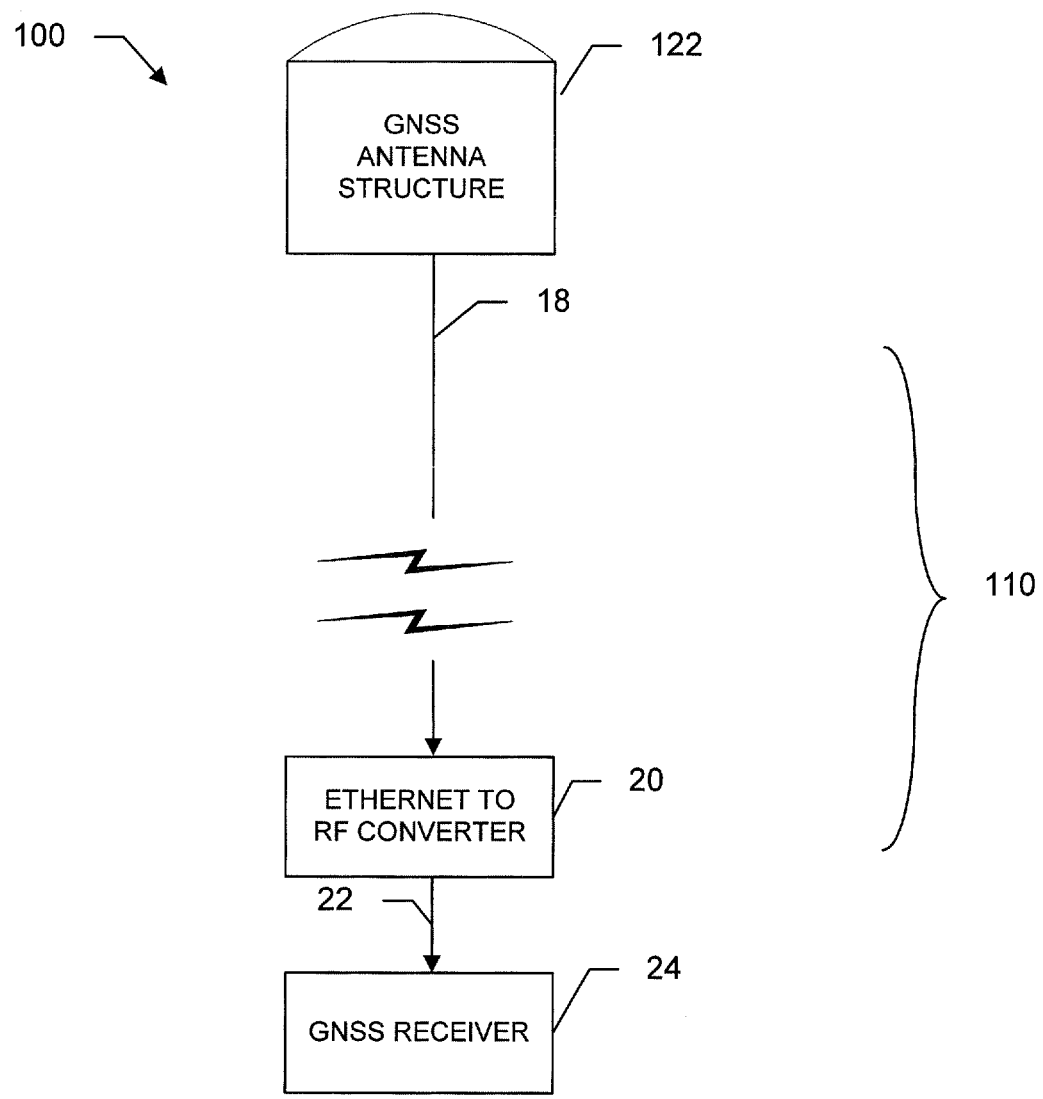
FIG. 5 is a functional block diagram of an alternative system constructed in accordance with the invention.
Figure 6:
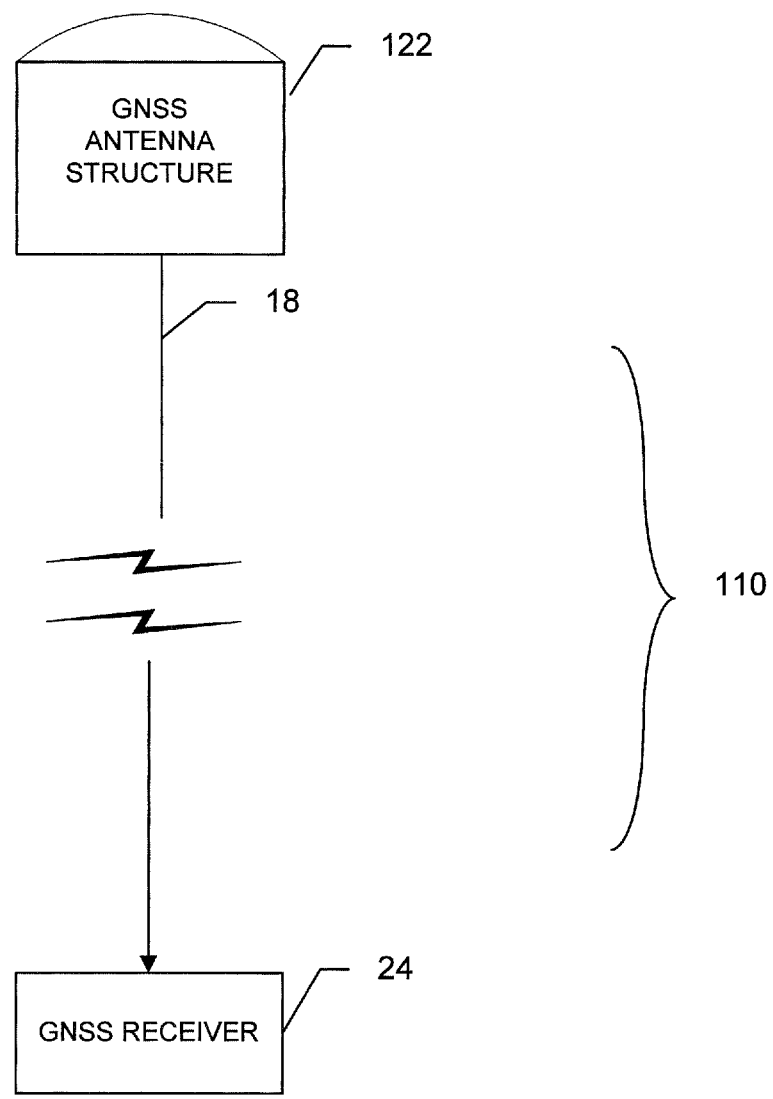
FIG. 6 is a functional block diagram of an alternative system constructed in accordance with the invention.

As depicted in FIG. 5, a GNSS antenna structure 122 may be configured to output its signals directly, that is, through an appropriate connector (not shown) to the digital communications conductor 18, such that a separate converter is not required. In this arrangement, the RF front end operations of downconversion to IF, sampling and A/D conversion are performed within the antenna structure. Alternatively, the antenna structure may include a filter, a sampler and an A/D converter that operates on the signals at RF frequencies, such that IF signals are produced, as necessary, at the receiver end of the subsystem 110. A combination of the GNSS receiver 24 of FIG. 4 and the GNSS antenna structure 12 of FIG. 5 may be used in the system 100, as depicted in FIG. 6, such that separate converters are not needed.

Figure 7:
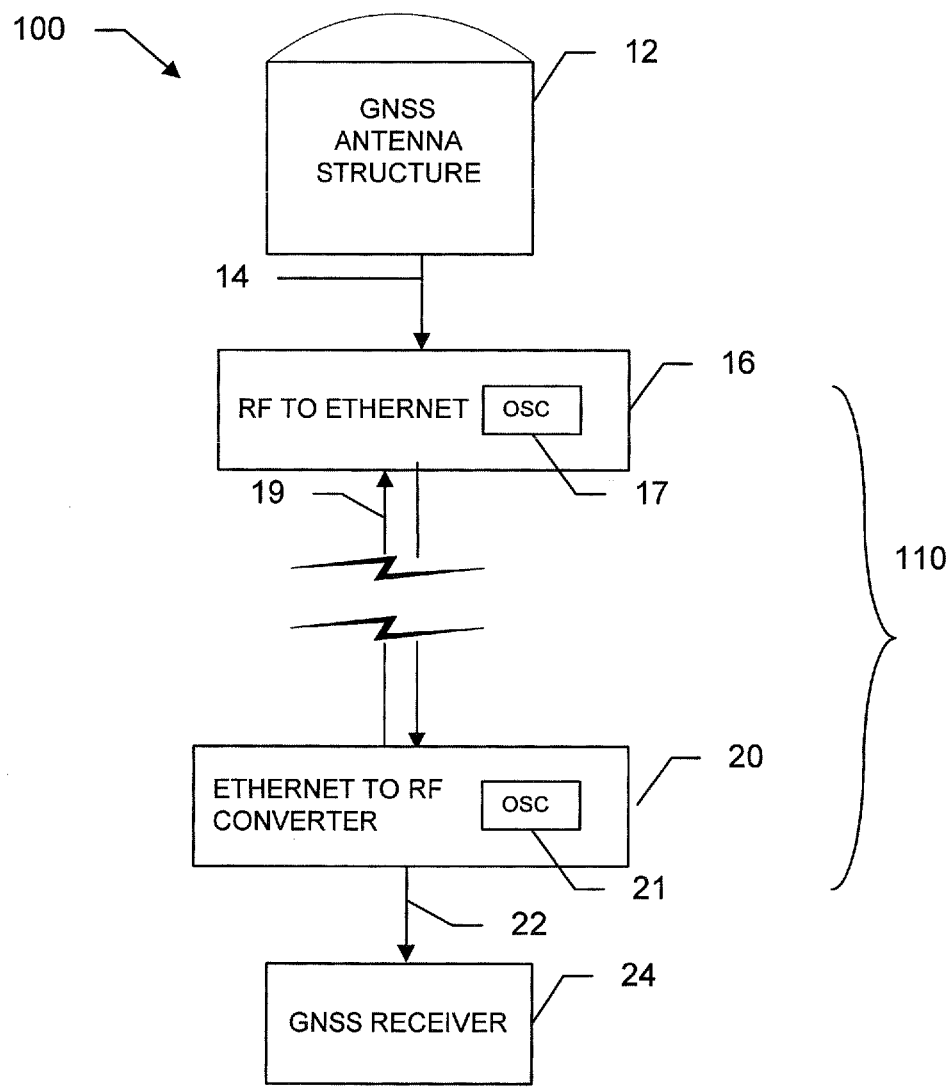
FIG. 7 is a more detailed functional block diagram of the system of FIG. 1.

Referring now to FIG. 7, if converters 16 and 20 are used at both ends of the digital communications conductor 18, care must be taken to synchronize the frequencies of the RF to Digital down-conversion with the Digital to RF up-conversion, in order to avoid or at least calibrate a frequency shift in the signals provided to the GNSS receiver due to differences in local oscillators at the converters. While a frequency shift in the signal is not normally a problem, the shift must be accounted for in the receiver tracking software, to avoid associated positioning errors. Thus, the local oscillators 17 and 21 in the converters 16 and 20 should be synchronized to one another or to an outside oscillator.

One way to synchronize the local oscillators is to use clock-recovery signals from synchronous digital data transmissions over the digital communications conductor 18. One of the converters 16 and 20 may act as the master and provide clocking information over the conductor 18 by synchronizing data transmissions to the local oscillator. The other, or slave, converter recovers the clock from the received synchronous transmissions, and uses the clock to phase lock its local oscillator to the local oscillator at the master converter. As depicted in the drawing by arrow 19, the converter 20 at the receiver end acts as the master, and provides to the converter 16 communications from which the clock can be recovered. Similarly, the local oscillators in any number of converters connected to the conductor 18 may be synchronized to the master local oscillator based on the clock information in the transmitted signals. Other known techniques for lock sychronization through data transmissions may be employed by the digital communication system 110 instead or in addition to the synchronous transmissions.

Figure 8:
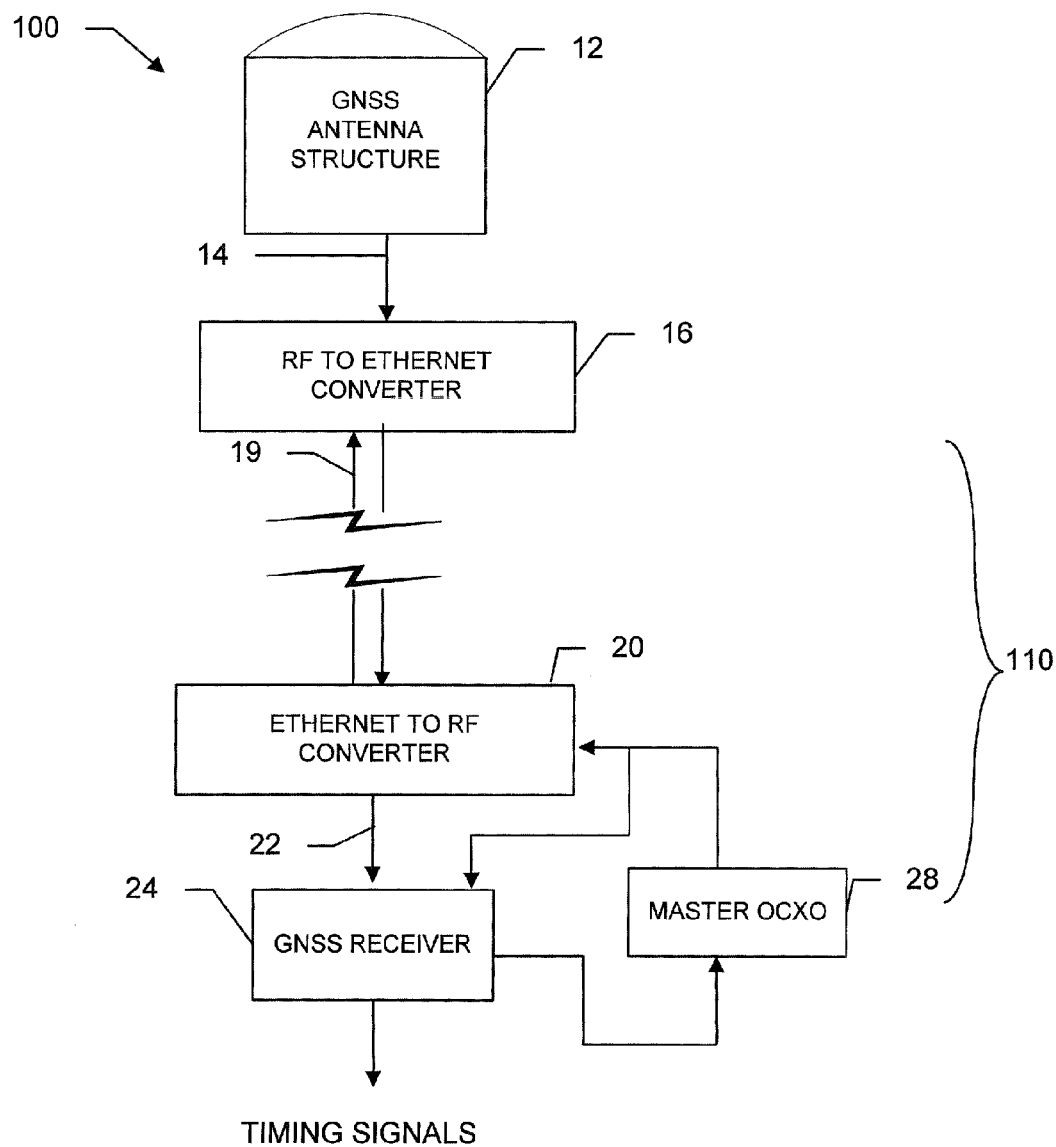
FIG. 8 is a functional block diagram of an alternative system constructed in accordance with the invention.

Referring now to FIG. 8, when the GNSS receiver 24 is to provide precise timing signals based on the Universal Time Coordinated (UTC) time scale, it may be necessary to slave the local oscillators in all of the converters 16 and 20 to a master oscillator 28 that is controlled by the GNSS receiver 24. As depicted in FIG. 8, the master oscillator may, for example, be an Oven Controlled Crystal Oscillator (OCXO). The converter 20 receives a frequency reference signal from the OCXO, and synchronizes its local oscillator to the OCXO. Further, the converter 20 provides frequency synchronization information, that is, synchronous data transmissions from which a clock can be recovered, to the converter 16 at the antenna end. The GNSS receiver 24 then computes time and frequency offsets from the received digitized data, that is, from the recovered satellite signals, and provides frequency correction signals to the OCXO. The OCXO, in turn, drives the local oscillator in the converter 20, to a known frequency, and the converter 20 provides to the converter 16 synchronous transmissions from which the converter can determine the clock for phase locking the local oscillator to the master oscillator. Additional slave local oscillators may be synchronized with the master oscillator in the same manner.

Figure 9:
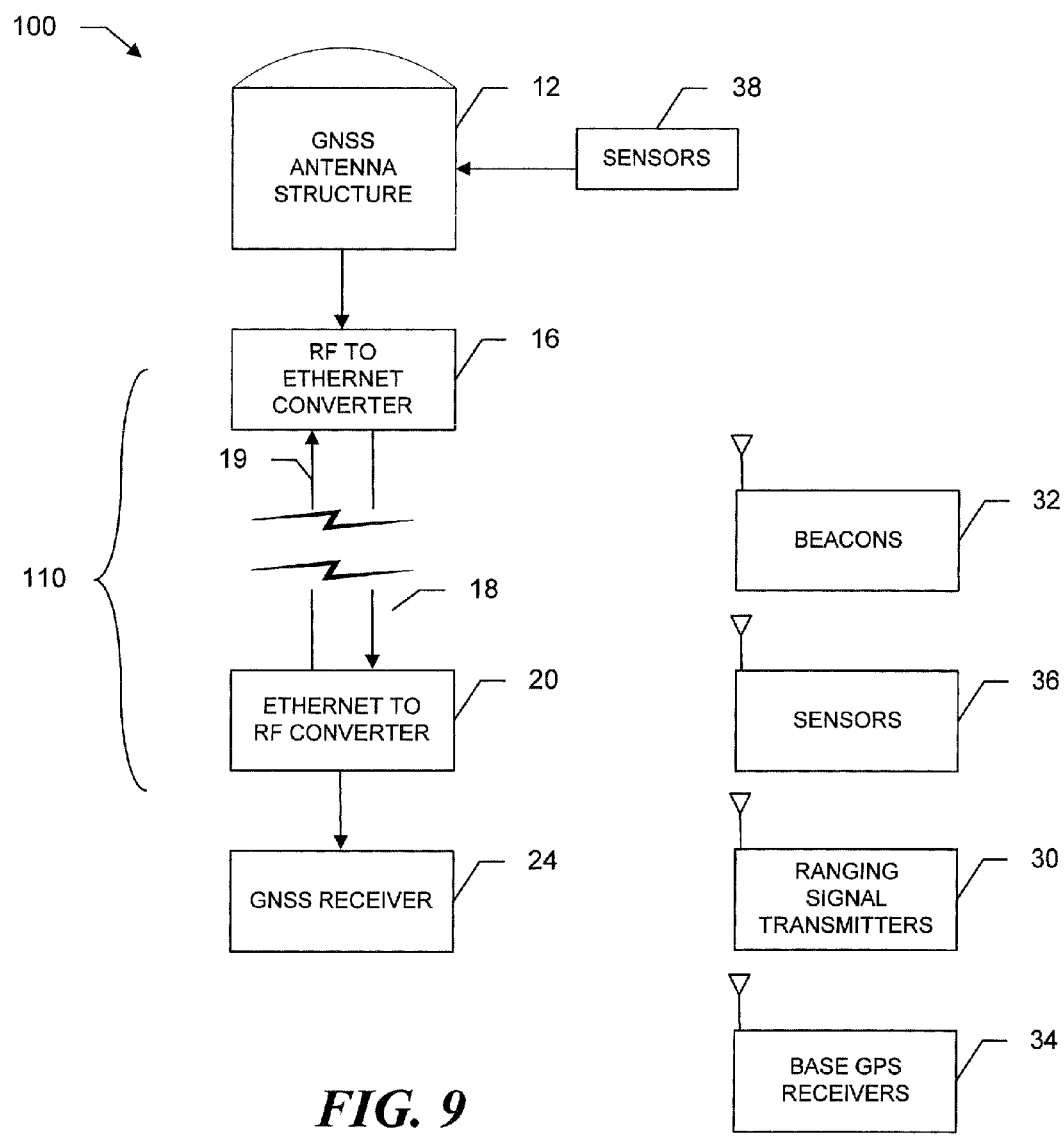
FIG. 9 is a more detailed functional block diagram of the environment in which a system constructed in accordance with the invention may operate.

Referring now to FIG. 9, the GNSS antenna structure 12 may also receive ranging signals from other satellites or ground-based transmitters 30, differential GNSS correction signals from beacons 32 or base GNSS receivers 34 and/or signals from transmitting sensors 36 or co-located sensors 38, such as inertial sensors, temperature sensors, barometric sensors, and so forth. These signals are also provided to the GNSS receiver 24 over the digital communications conductor 18. As appropriate, the RF to Ethernet converter 16 converts the signals to digital signals that preserve relative timing information and other signal information, such as ranging signal carrier and code phases, needed by the GNSS receivers 24. The converter also formats the signals with appropriate headers and payloads that identify the sources and/or types of signals. Alternatively or in addition, the sensor or other signals may be supplied to the digital communications conductor through other Ethernet connectors and/or converters (not shown). The GNSS receiver uses the non-GNSS information, such as inertial measurements, temperature, barometric pressure and so forth, in a known manner, along with the received satellite signals, to produce position information.

Additionally, or in contrast, the converter 16 may upconvert the non-GNSS signals to a GNSS frequency, or a slightly offset frequency, and combine the non-GNSS signals with the GNSS signals, before producing the formatted signals for transmission. A system for upconverting the non-GNSS signals is described in co-pending United States Published Patent Application US2007/0262899, which is assigned to the same assignee and incorporated herein in its entirety by reference.

As described herein, the digital communications conductor may be Cat5 (twisted copper pairs), Cat6, fiber-optic cable, or a high speed digital serial link cable. The communications protocol may be Ethernet, USB, FireWire, RocketIO, or other digital communication protocol. Alternatively, or in addition, the digital communications subsystem may use time multiplexing to send signals from different antennas or antenna elements or different signal sources, with or without incorporating further signal source or type identifying information.

What is claimed is:

1. A system consisting of:
one or more sensors that provide signals containing non-GNSS information;
one or more remote GNSS antenna structures adapted to receive GNSS signals and the signals provided by the one or more sensors;
a digital communication subsystem including:
one or more RF to formatted digital signal converters, at a first end of the subsystem nearest to the one or more remote GNSS antenna structures, to receive signals from the one or more remote GNSS antenna structures and produce digital signals that are formatted for transmission and correspond to the received GNSS signals and the signals provided by the one or more sensors and preserve carrier frequency and phase information and code phase information from which the received GNSS signals can be fully recovered,
one or more formatted digital signal to RF converters, at a second end of the subsystem nearest to one or more GNSS receivers, for converting the digital signals to RF signals for use by the one or more GNSS receivers, and
a digital communications high speed conductor consisting of a single continuous high speed digital serial link cable spanning an entire distance between the one or more RF to formatted digital signal converters at the first end and the one or more formatted digital signal to RF converters at the second end without any intervening devices, the single continuous high speed digital serial link cable transmitting the digital signals from all of the one or more RF to formatted digital signal converters to all of the one or more formatted digital signal to RF converters; and
one or more GNSS receivers located remotely from the remote GNSS antenna structures and the sensors and directly coupled to receive the RF signals from the one or more formatted digital signal to RF converters, the one or more GNSS receivers adapted to recover the code and carrier phase information and the non-GNSS information and use the code and carrier phase information and the non-GNSS information to produce position information.

2. The system of claim 1 wherein one remote GNSS antenna structure is optimized for the receipt of GPS signals and another remote GNSS antenna structure is optimized for the receipt of one or more other GNSS satellite signals.

3. The system of claim 1 wherein the one or more remote GNSS antenna structures downconvert the received GNSS signals to intermediate frequency signals.

4. The system of claim 1 wherein one or more of the sensors are co-located with the one or more remote GNSS antenna structures.

5. The system of claim 1 wherein one converter provides to the digital communications conductor signals from which other converters can recover clock information for synchronizing local oscillators.

6. The system of claim 1 wherein
the one or more sensors are inertial sensors, temperature sensors, barometric sensors, or combinations thereof.

7. The system of claim 1 wherein
the one or more remote GNSS antenna structures are further adapted to receive differential GNSS correction signals, and
the digital communication subsystem is further adapted to convert the correction signals into digital signals that are formatted for transmission and include information associated with a source or type of the correction signals.

8. The system of claim 1 wherein
the one or more remote GNSS antenna structures are further adapted to receive ranging signals from ground-based devices or other satellites, and
the digital communication subsystem is further adapted to convert the ranging signals into digital signals that are formatted for transmission and include information associated with a source or type of the ranging signals and carrier and code phase information.

9. The system of claim 6 wherein
the one or more remote GNSS antenna structures are further adapted to receive differential GNSS correction signals, and
the digital communications subsystem is further adapted to convert the correction signals into digital signals that are formatted for transmission and include information associated with a source or type of the correction signals.

10. The system of claim 9 wherein
the one or more remote GNSS antenna structures are further adapted to receive ranging signals from ground-based devices or other satellites, and
the digital communications subsystem is further adapted to convert the ranging signals into digital signals that are formatted for transmission and include information associated with a source or type of the ranging signals and carrier and code phase information.

11. The system of claim 6 wherein
the one or more remote GNSS antenna structures are further adapted to receive ranging signals from ground-based devices or other satellites, and
the digital communications subsystem is further adapted to convert the ranging signals into digital signals that are formatted for transmission and include information associated with a source or type of the ranging signals and carrier and code phase information.

12. The system of claim 7 wherein
the one or more remote GNSS antenna structures are further adapted to receive ranging signals from ground-based devices or other satellites, and
the digital communications subsystem is further adapted to convert the ranging signals into digital signals that are formatted for transmission and include information associated with the source of the ranging signals.

13. The system of claim 1 wherein one or more sensors are transmitting sensors.

14. The system of claim 1 wherein the digital communication subsystem further includes in digital signals information associated with sources or types of signals provided by respective sensors.

15. The system of claim 1 wherein a given GNSS receiver connects to the high speed serial link cable.

16. The system of claim 1 wherein the GNSS antenna structures are directly coupled to the first end of the digital communication subsystem.

17. A system consisting of:
one or more sensors that provide signals containing non-GNSS information;
one or more remote GNSS antenna structures adapted to receive GNSS signals and the signals provided by the one or more sensors;
a digital communication subsystem including:
one or more RF to formatted digital signal converters, at a first end of the subsystem nearest to the one or more remote GNSS antenna structures, to receive signals from the one or more remote GNSS antenna structures and produce digital signals that are formatted for transmission and correspond to the received GNSS signals and the signals provided by the one or more sensors and preserve carrier frequency and phase information and code phase information from which the received GNSS signals can be fully recovered,
one or more formatted digital signal to RF converters, at a second end of the subsystem nearest to one or more GNSS receivers, for converting the digital signals to RF signals for use by the one or more GNSS receivers, and
a digital communications high speed conductor consisting of a single continuous high speed digital serial link cable spanning an entire distance between the one or more RF to formatted digital signal converters at the first end and the one or more formatted digital signal to RF converters at the second end of the digital communication subsystem without any intervening devices, the single continuous high speed digital serial link cable transmitting the digital signals from all of the one or more RF to formatted digital signal converters to all of the one or more formatted digital signal to RF converters; and
one or more GNSS receivers located remotely from the remote GNSS antenna structures and the sensors and directly coupled to receive the RF signals from the one or more formatted digital signal to RF converters, the one or more GNSS receivers adapted to recover the code and carrier phase information and the non-GNSS information and use the code and carrier phase information and the non-GNSS information to produce position information.

18. The system of claim 17 wherein
the one or more remote GNSS antenna structures are further adapted to receive differential GNSS correction signals, and
the digital communications subsystem is further adapted to produce corresponding formatted digital signals that include information associated with a source or type of the correction signals.

19. The system of claim 17 wherein the one or more formatted digital signal to RF converters are synchronized to or at a known offset from the RF to formatted digital signal converters.

20. The system of claim 17 wherein the sensors are one or more of inertial sensors, temperature sensors, barometric sensors or combinations thereof.

21. The system of claim 20 wherein
the one or more remote GNSS antenna structures are further adapted to receive ground-based or other satellite ranging signals, and
the digital communications subsystem is further adapted to produce corresponding formatted digital signals that include information associated with a source or type of the ranging signal and carrier and code phase information.

22. The system of claim 17 wherein the high speed serial link cable connects to a given GNSS receiver.

23. A system consisting comprising:
a plurality of remote GNSS antenna structures configured to receive GNSS satellite signals;
a plurality of RF to formatted digital converters configured to produce formatted digital signals corresponding to the received GNSS satellite signals that include carrier frequency and phase information and code phase information from which the received GNSS signal can be fully recovered;
a single continuous high speed digital serial link cable spanning an entire distance between the plurality of RF to formatted digital converters and a plurality of formatted digital signal to RF converters, the single continuous high speed digital serial link cable configured to transmit all formatted digital signals from all of the plurality of RF to formatted digital converters to all of the plurality of formatted digital signal to RF converters;

the plurality of formatted digital signal to RF converters configured to convert the formatted digital signals received, over the single continuous high speed digital serial link cable spanning an entire distance between the plurality of RF to formatted digital converters and the plurality of formatted digital signal to RF converters, to RF signals; and one or more GNSS receivers configured to receive the RF signals from the one or more formatted digital signal to RF converters, the GNSS receivers being remote from the one or more remote GNSS antenna structures.

\* \* \* \* \*

UNITED STATES PATENT AND TRADEMARK OFFICE
CERTIFICATE OF CORRECTION

| | | |
|---|---|---|
| PATENT NO. | : 9,164,176 B2 | Page 1 of 1 |
| APPLICATION NO. | : 12/126021 | |
| DATED | : October 20, 2015 | |
| INVENTOR(S) | : Patrick C. Fenton | |

It is certified that error appears in the above-identified patent and that said Letters Patent is hereby corrected as shown below:

In the Specification:
Col. 1, lines 55-56 should read:
forth that, as necessary, identify the sources of information and/or types of information contained in
the signals. The Col. 3, line 16 should read:
reference to FIG. 7, local oscillators in the converters 16 and 20

Col. 4, line 61 should read:
transmitted signals. Other known techniques for clock Signed and Sealed this
Fifteenth Day of March, 2016

Michelle K. Lee
*Director of the United States Patent and Trademark Office*